June 28, 1966     H. E. TRACY     3,257,957
MECHANICAL SEAL AND CYCLONE
Original Filed June 1, 1962     3 Sheets-Sheet 1
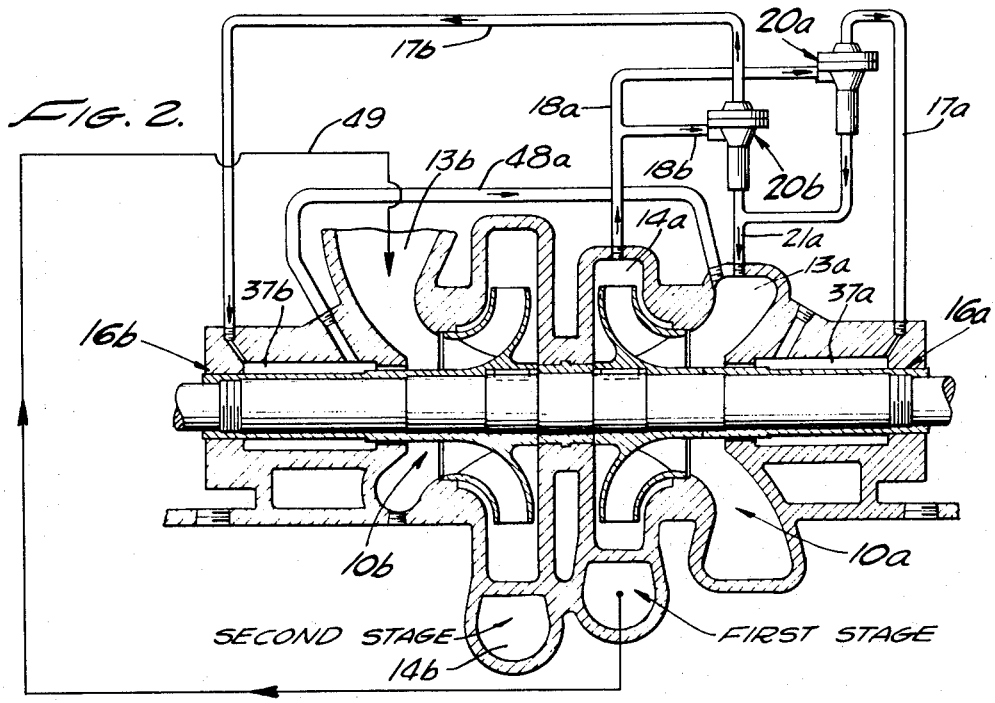
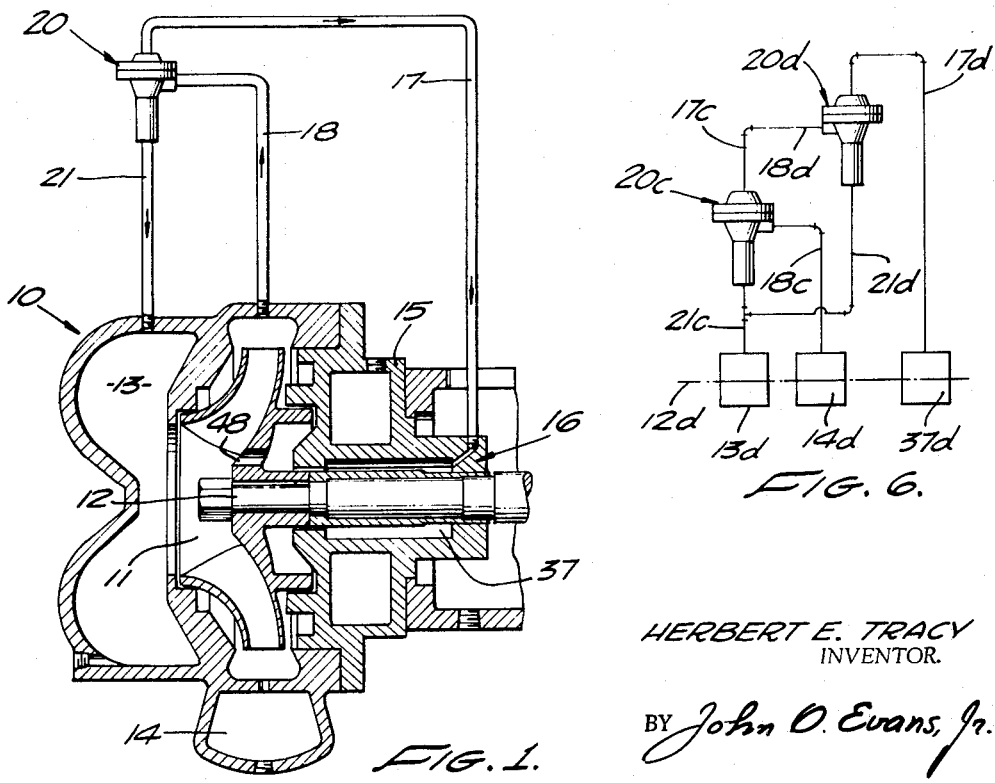
HERBERT E. TRACY
INVENTOR.
BY John O. Evans, Jr.
ATTORNEY June 28, 1966  H. E. TRACY  3,257,957
MECHANICAL SEAL AND CYCLONE
Original Filed June 1, 1962  3 Sheets-Sheet 2
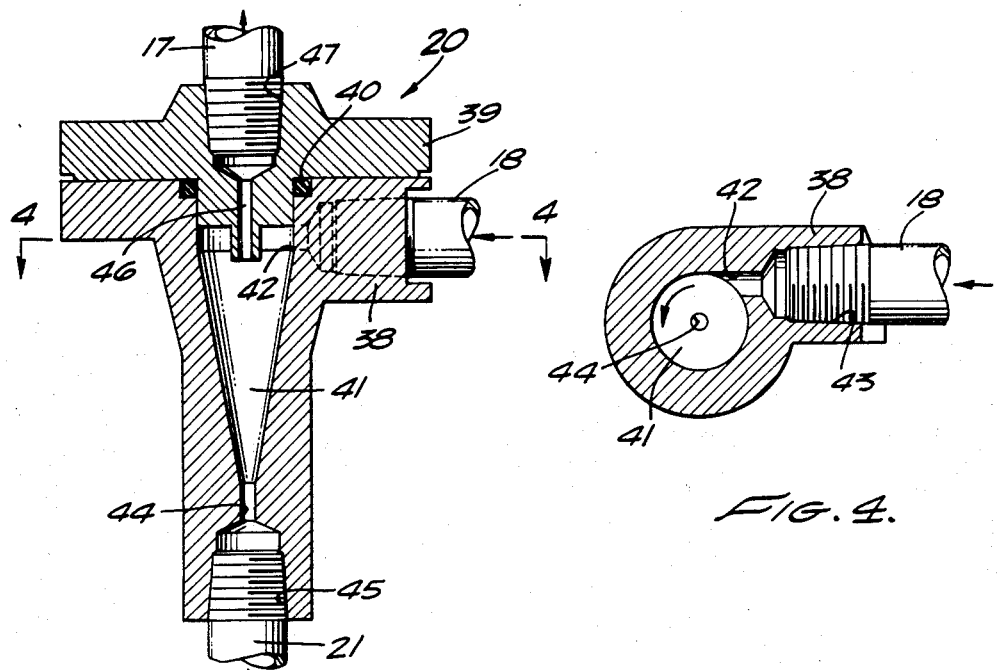
FIG. 3.
FIG. 4.
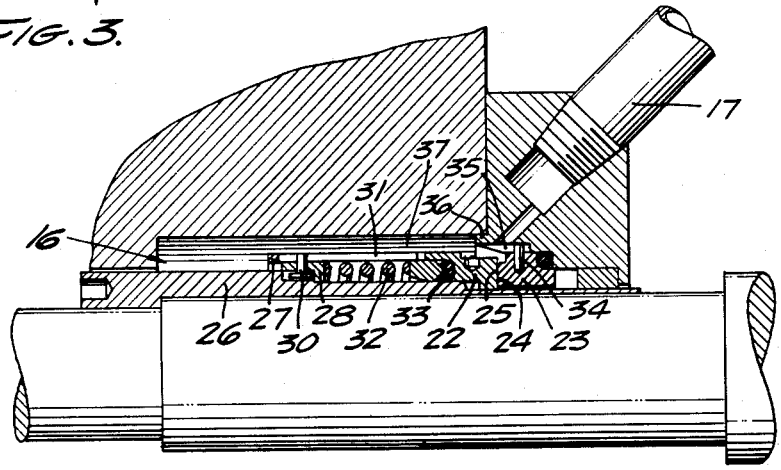
FIG. 5.
HERBERT E. TRACY
INVENTOR.
BY John O. Evans, Jr.
ATTORNEY

United States Patent Office 3,257,957
Patented June 28, 1966

3,257,957
MECHANICAL SEAL AND CYCLONE
Herbert E. Tracy, Alhambra, Calif., assignor to Borg-Warner Corporation, Chicago, Ill., a corporation of Illinois
Continuation of application Ser. No. 199,332, June 1, 1962. This application Nov. 13, 1964, Ser. No. 411,024
13 Claims. (Cl. 103—111)

This invention relates, in general, to mechanical seals adapted to prevent leakage of fluid under pressure from between a housing and a rotating shaft and relates, in particular, to a new and improved mechanical seal which incorporates a cyclone separator in combination therewith as a means for cleaning the fluid communicated to the mechanical seal.

This application is a continuation of my copending application for United States Letters Patent, Serial No. 199,332, filed June 1, 1962, for "Mechanical Seal and Cyclone," now abandoned.

Mechanical seals, or rotary seals as they are sometimes called, usually comprise one or more rings which are held stationary with respect to the housing and one or more rings which are fixed for rotation on or with the shaft. Each sealing ring, sometimes called sealing elements or means, are provided with a face which opposes a face of another sealing ring and arranged so that in response to either fluid pressure or spring pressure or both, there is a sealing relationship between these opposed faces to form a seal to prevent leakage along the shaft. This sealing relationship does not necessarily mean that these opposing sealing faces are in direct contacting relationship with one another but that a small lubricating film of fluid is permitted between these faces to prevent or reduce (in the case of metal rings) direct metal-to-metal contact therebetween.

This lubricating film is usually the fluid being sealed and reduces wear and/or seizure of the sealing faces, but sometimes contains solids or particulate material which can cause damage. This is particularly important if the particulate material enters the fluid which is in-between the sealing faces inasmuch as these faces are customarily lapped flat to reduce any wear but subject to damage readily.

Accordingly, it is a principal object of this invention to provide a mechanical seal with a means for cleaning the fluid which enters the mechanical seal.

Briefly, this invention comprises incorporating a cyclone separator in a mechanical seal in the path of flow of fluid to the seal so that the solid or particulate material may be removed.

Accordingly, a more specific object of this invention is to provide a mechanical seal in combination with a cyclone separator for cleaning the fluid which is directed to the mechanical seal from the source of fluid.

These and other objects of this invention will become apparent from the following description when taken in connection with the accompanying drawings and in which:

FIGURE 1 is a cross-sectional view, partly schematic, illustrating to advantage the mechanical seal together with the cyclone separator incorporated in a centrifugal pump in such a way that the fluid directed to the mechanical seal is cleaned;

FIGURE 2 is a cross-sectional view, partly schematic, illustrating to advantage a pair of cyclone separators as part of a pair of mechanical seals incorporated in a double pump for cleaning the fluid directed thereto;

FIGURE 3 is an enlarged detailed sectional view of a cyclone separator incorporated in either FIGURES 1 or 2;

FIGURE 4 is a cross-sectional plan view taken along line 4—4 of FIGURE 3 and looking in the direction of the arrows;

FIGURE 5 is an enlarged view illustrating to advantage a typical mechanical seal used in the combination with a cyclone separator as illustrated in FIGURES 1 and 2;

FIGURE 6 is a schematic illustration illustrating a pair of cyclone separators as part of a mechanical seal but arranged in series for cleaning the fluid directed thereto.

Figure 7:
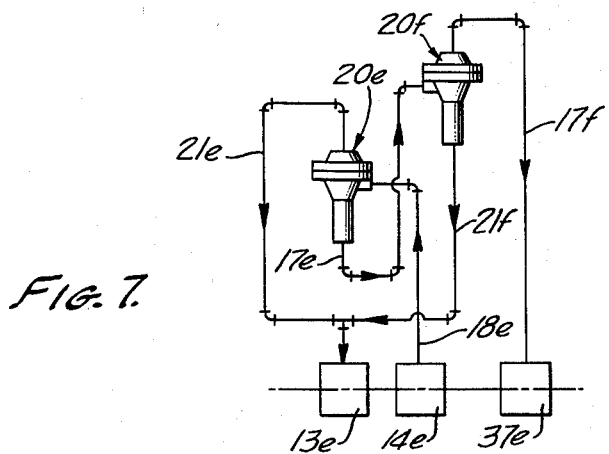
FIGURE 7 is a view, largely diagrammatic, of an apparatus incorporating cyclone separators for removing both gas and solid particles from liquid to be used to lubricate a shaft seal.

Turning now in particular to FIGURE 1, it can be seen that there is illustrated therein a centrifugal pump, indicated in its entirety as 10, having an impeller 11 mounted for rotation on a shaft 12 and driven by a source of power (not shown). Fluid entering the inlet chamber 13 is impelled by the impeller 11 out the outlet chamber 14.

To prevent the flow of fluid from leaking from the pump housing 15 out along the shaft 12, a mechanical seal indicated in its entirety as 16, is provided. Mechanical seal 16, to be described in detail hereinafter, is under the influence of the fluid in the pump and which, in the embodiment disclosed, is communicated thereto by inlet piping or conduit 17 which is in turn connected to an outlet conduit 18 communicating directly with the impeller outlet 14.

As previously mentioned, the fluid which is communicated to the mechanical seal, when communicated directly through conduits such as 17 and 18, may contain fluid which is detrimental to the operation of the mechanical seal and it is to the cleaning of this fluid and the prevention of damage to the mechanical seal that this invention pertains.

In the embodiment disclosed, the means for cleaning the fluid comprises the cyclone separator, illustrated in its entirety in FIGURE 1 as 20, shown interposed between the outlet conduit 18 and the inlet conduit 17 and having a return conduit 21 communicating to the pump inlet 13.

Having now described generally the environment in which the combination of the cyclone separator and mechanical seal is utilized, a more detailed description of the mechanical seal and the cyclone separator and its operation will now be set forth.

Turning first to FIGURE 5, it can be seen that this is an enlarged fragmentary sectional view of the mechanical seal illustrated in FIGURE 1 and comprises a rotatable ring 22 and a stationary ring 23, each having opposed sealing faces 24 and 25, respectively.

The rotatable sealing ring 22 is suitably attached to the shaft 12 by an attaching means which in this illustrated embodiment comprises a sleeve 26 which fits over the shaft 12 and over which a cup-like spring holder 27 is telescoped. Sleeve 26 is affixed to the shaft by any suitable means (not shown) and the spring holder 27 is fixed for rotation with the sleeve 26 by means of a collar 28 and pins 30 (one shown) which extend radially outwardly through longitudinal slots 31 (one shown) in the spring holder. The sleeve 26 provides a means for adjustably fitting the spring holder to the shaft to accommodate variations in the size of the spring holder and the shaft in accordance with good engineering practice.

The spring holder 27 is subject to the action of a helical spring 32 which encompasses the sleeve 26 and urges a cup-like seal 33 and sealing ring 22 towards the stationary sealing ring 23 in the conventional manner. Slots 31 permit limited axial movement of the sealing ring 22 and serve to react with the pins 30 during rotation of the sealing ring with the shaft.

The non-rotatable or stationary sealing ring 23 is held in the housing against rotation in any suitable manner, such as by pins 34 (one shown), which engage slots 35 in the housing flange 36.

From the above description, it can be seen that fluid from the pump outlet being introduced in the mechanical seal from the inlet conduit 17 is permitted to flow into the bore 37 in the pump housing 15 but is prevented from leaking out along the shaft by the sealing rings 22 and 23.

The rotating and non-rotating sealing rings, being usually of different materials, such as hard metal like Stellite on the one hand, or carbon or soft metal like bronze on the other, will wear quite rapidly when in contacting relationship even when the sealing faces are lapped optically flat. Hence, it can be seen that the fluid being sealed and directed to the mechanical seal may contain particulate material which must be removed to prevent damage to the seal.

Turning now to FIGURES 3 and 4, it is to be noted that the cyclone separator disclosed therein is an enlarged more detailed cross-sectional view of the cyclone separator 20 sometimes called a hydrocyclone and previously referred to in FIGURE 1. Cyclone separator 20 comprises a housing formed of two parts, body 38 and cover 39, attached together and sealed against leakage in any suitable manner as by O-ring seals 40. Body 38 is provided with a conical chamber 41 and a tangential inlet or feed passage 42 which, in turn, is connected in any suitable manner as by threading 43 to the outlet conduit 18 so that fluid from the outlet 14 of the pump is directed tangentially into the conical chamber. Thus, fluid containing solids forms a vortex which spins rapidly around the conical chamber with a result that a separation of solid or particulate material occurs under the influence of centrifugal force. The solid material and some fluid then are permitted to flow through the apex passage 44 which, in turn, is connected in any suitable manner as by threads 45 to the return conduit 21 to return to the pump inlet 13. It is thus seen that the passage 44 provides an outlet means for the chamber 41. With the general liquid flow pattern, as described, the overflow is permitted to pass through exit passage 46 formed in the cover 39 to flow out through the inlet conduit 17 connected to the cover in any suitable manner as by threading 47 to its mechanical seal 16. It is to be noted that the exit passage or overflow means 46 is extended below the tangential feed as illustrated in FIGURE 3 so as to provide for proper operation of the cyclone separator.

Turning again to FIGURE 1 as well as to FIGURE 3, it can be seen that fluid from the pump discharge 14 is fed tangentially into the conical chamber 41 of the cyclone separator whereupon a vortex of liquid and particles is formed therein. By the operation of centrifugal force, previously alluded to, solids and particulate material contained in some of the liquid of the vortex will pass out the apex passage 44 and be returned to the pump inlet 13. The cleaner fluid in the center of the vortex will overflow out the discharge 46 and thence to the inlet conduit 17 into the seal chamber or bore 37. Overflow of fluid in the bore 37 is permitted to flow toward the pump inlet past the sleeve 26 and through bore 48 in the impeller 11. Sleeve 26 acts as a meter to regulate the flow of fluid toward the inlet. Thus, the bore 37 is maintained at a pressure such to permit the flow of fluid from the conduit 17 to the pump inlet 13 to maintain proper circulation of the fluid. By way of example, if the pressure in outlet conduit 18 is 130 p.s.i. and the pressure at the bore 37 is 30 p.s.i., which is the same or substantially the same pressure as inlet 13, suitable flow for the mechanical seal and for separation of particulate material is established and maintained.

Turning now to FIGURE 2, there is disclosed in the two-stage, double pump shown therein a pair of pumps 10a and 10b with individual seals 16a and 16b arranged so that each of the mechanical seals is combined with its individual cyclone separators 20a and 20b. In this arrangement, one pump inlet 13a and the pump outlet 14a supply cyclone separators 20a and 20b from a common inlet conduit 18a and to a common discharge conduit 21a, and the cyclone separators are arranged in parallel to supply the individual mechanical seals 16a and 16b. As is conventional in double pumps having two stages, fluid under pressure from the outlet chamber 14a of the first-stage pump 10a is conducted, as indicated diagrammatically by the line 49, to the inlet chamber 13b of the second-stage pump 10b, in which the fluid is pumped to achieve a still higher pressure in the second-stage outlet chamber 14b. As further shown in FIGURE 2, a conduit 48a communicates the bore 37b of the second-stage pump with the inlet chamber 13a of the first-stage pump to return fluid from this bore to chamber 13a, as indicated by the arrow in conduit 48a. Since the operation of these combined cyclone separators and mechanical seals are substantially identical with the description used in connection with FIGURES 1 and 3–5, except for their common inlet and discharge, no further description is deemed necessary herein. Parts having identical function are given identical reference numerals except for the suffix a or b.

Turning now to FIGURE 6, it will be seen that the schematic showing therein illustrates a pair of cyclone separators 20c and 20d arranged in tandem so that the overflow from the cyclone separator 20c is introduced tangentially into the cyclone separator 20d whereupon its overflow is directed to the mechanical seal chamber or bore 37d in the pump housing. Again, since parts having functions identical with parts described in FIGURES 1–5 have been given identical reference numerals except for the suffix c or d, and the pump inlet and pump outlet as the source and return of the fluid pressure have been identified diagrammatically and given appropriate reference numerals and suffixes to indicate their function in the tandem cyclone separator arrangement of this figure, no further description thereof is deemed necessary.

A similar arrangement could be used also where gas was a problem by having cyclone separator 20c remove gas from the fluid flowing from the outlet 14d to the cyclone separator 20d. The eliminated gaseous material will then be returned to the inlet 13d through a suitably arranged conduit and the degassed fluid will flow to the cyclone separator 20d. Particulate material removed by cyclone separator 20d will return through another suitably arranged conduit while the clean fluid will continue on through a conduit to the bore 37d. Such similar arrangement is shown diagrammatically in FIGURE 7.

Referring to FIGURE 7, liquid containing a gas and particulate material flows from the outlet chamber 14e of the pump through the pipe 18e to the inlet fitting of the first cyclone separator 20e. In the conical separating chamber 41 of this cyclone separator (see FIGURE 3), the gas, being lighter than the liquid, moves towards the axis of the chamber, and a liquid fraction containing the gas is withdrawn through the overflow passage 46 and returned through the pipe 21e to the inlet chamber 13e of the pump. The particulate matter, being heavier than the liquid, moves towards the conical walls of the separating chamber 41, and this particulate material, together with another fraction of liquid, passes out of the separating chamber through the apex outlet 41.

This degassed liquid fraction containing the particulate material flows through a pipe 17e and through the inlet fitting of the second cyclone separator 20f into its separating chamber. From the separator 20f, a clean fraction of liquid is withdrawn through the overflow passage 46 and passed through the pipe 17f to the bore 37e to lubricate the seal therein, the lubrication being effected in the manner explained hereinbefore with reference to FIGURE 5. Another fraction of liquid, containing substantially all of the particulate material, flows from the apex opening of the separating chamber of separator 20f, and returns to the inlet chamber 13e of the pump through the pipe 21f.

Thus, a cleaned fraction of liquid for lubricating the seal is separated from a portion of the liquid being pumped, which latter liquid is contaminated with gas and particulate material and, hence, is unsatisfactory for seal lubrication purposes. This cleaned fraction of liquid is flowed to the pump seal. The gas and particulate material, together with the balance of the liquid from the separators, are returned to the pump; hence, there is no loss of the liquid being pumped.

While the various parts herein may have been described as upper and lower or in a right or left position, such description refers only to the relative position of the parts as shown in the drawings and is not intended to be a limitation of the invention; it being understood that the appended claims should be construed as broadly as the prior art will permit.

I claim:

1. In combination with assemblies for sealing a rotating shaft within a housing comprising seal means within said housing to prevent the flow along the shaft outwardly of the housing, each said seal means including a part that rotates with the shaft and a part that is stationary in the housing, said parts being under the influence of the fluid being sealed, means communicating said fluid to each said seal means, of means defining cyclone separators connected in parallel and subject to the fluid being sealed for cleaning the fluid being sealed in said seal means.

2. In combination with assemblies for sealing a rotating shaft within a housing, each comprising seal means within said housing to prevent the flow along the shaft outwardly of the housing, each said seal means including a part that rotates with the shaft and a part that is stationary in the housing, means for communicating fluid from a source of fluid under pressure to said seal means, of means defining cyclone separators connected in parallel between said source of fluid under pressure and each said seal means for cleaning said fluid before it reaches each said seal means.

3. In combination with an assembly for sealing a rotating shaft within a housing comprising seal means within said housing to prevent the flow along the shaft outwardly of the housing, said seal means including a part that rotates with the shaft and a part that is stationary in the housing, said parts being under the influence of the fluid being sealed, means communicating said fluid to said assembly, of means defining cyclone separators connected in series and subject to the fluid being sealed for cleaning and degassing the fluid being sealed in said seal means.

4. In combination with an assembly for sealing a rotating shaft within a housing comprising seal means within said housing to prevent the flow along the shaft outwardly of the housing, said seal means including a part that rotates with the shaft and a part that is stationary in the housing, means for communicating fluid from a source of fluid under pressure to said assembly, of means defining cyclone separators connected in series and located between the source of fluid under pressure and said parts for cleaning and degassing said fluid before it reaches said parts.

5. In a system for cleaning a contaminated fluid which is communicated under pressure into the zone of mechanical seal means, the combination comprising a housing, a rotatable shaft in said housing, at least two pressure creating means positioned in spaced relation and arranged to be driven by said shaft, seal means surrounding said shaft and arranged to prevent the flow of the fluid along said shaft outwardly of said housing, said seal means including members having relatively rotating sealing faces, plural interconnected cyclone separator means and conduit means affording communication between the plural cyclone separator means and the pressure creating means and seal means whereby the contaminated pressurized fluid is forced by said pressure creating means through said cyclone separator means and cleaned before passage to said seal means, so that the cleaned fluid is directed to the mechanical sealing means from the source of fluid under pressure.

6. The combination with a centrifugal pump having a housing, inlet and outlet chambers, an impeller in said housing for impelling fluid from said inlet chamber to said outlet chamber, a shaft-opening in said housing, a shaft in said opening, said shaft being connected to said impeller to drive said impeller upon rotation of said shaft, and seal means for sealing said shaft in said opening, of a cyclone separator having a saparating chamber therein, inlet means admitting fluid to be cleaned into said separating chamber, outlet means discharging a contaminated fraction of said fluid from said separating chamber, and means discharging a cleaned fraction of said fluid from said separating chamber; conduit means communicating said inlet means with said outlet chamber; conduit means communicating said outlet means with said inlet chamber; and means for conducting fluid from said means discharging a cleaned fraction of fluid to said seal means to lubricate the latter.

7. The combination with a centrifugal pump having a housing, inlet and outlet chambers, an impeller in said housing for impelling fluid from said inlet chamber to said outlet chamber, a shaft-opening in said housing, a shaft in said opening, said shaft being connected to said impeller to drive said impeller upon rotation of said shaft, and seal means for sealing said shaft in said opening, of a cyclone separator having a separating chamber and fluid inlet means, outlet means, and overflow means for said separating chamber; conduit means communicating said fluid inlet means with said outlet chamber; conduit means communicating said fluid outlet means with said inlet chamber; and means for conducting fluid from said fluid overflow means to said seal means to lubricate the latter.

8. A fluid pumping apparatus having a shaft seal lubricated by a portion of the fluid being pumped, said pumping apparatus comprising:
  (a) a fluid pump including
    (i) a housing having an inlet chamber and an outlet chamber, said housing providing a shaft-opening therein,
    (ii) a shaft rotatably mounted in said shaft-opening and spaced from the walls thereof,
    (iii) an impeller arranged to impel fluid from said inlet chamber to said outlet chamber, said impeller being actuated by rotation of said shaft,
    (iv) seal means comprising a rotating sealing element carried by said shaft and a stationary sealing element carried by said housing, said elements having opposed, relatively rotating sealing faces, for sealing the space between said shaft and the walls of said shaft-opening, and
    (v) means for applying lubricating fluid to said opposed sealing faces;
  (b) a cyclone separator having a separating chamber therein, inlet means admitting fluid to be cleaned into said separating chamber, outlet means discharging a contaminated fraction of said fluid from said separating chamber, and means discharging a cleaned fraction of said fluid from said separating chamber;
  (c) first conduit means communicating said outlet chamber of said pump with said inlet means of said separating chamber;
  (d) second fluid conduit means communicating said outlet means of said separating chamber with said inlet chamber of said pump; and
  (e) third fluid conduit means communicating said means discharging a cleaned fraction of said fluid from said separating chamber with said means for applying lubricating fluid to said opposed sealing faces.

9. A fluid pumping apparatus having a shaft seal lubricated by a portion of the fluid being pumped, said pumping apparatus comprising:
  (a) a centrifugal pump including (i) a housing having an inlet chamber and an outlet chamber, said housing providing a shaft-opening therein,
(ii) a shaft rotatably mounted in said shaft-opening and spaced from the walls thereof,
(iii) a centrifugal impeller carried by said shaft inside of said housing and arranged to impel fluid from said inlet chamber to said outlet chamber upon rotation of said shaft,
(iv) seal means in said shaft-opening, said seal means comprising a rotating sealing ring carried by said shaft and a stationary sealing ring carried by said housing, said sealing rings having opposed, relatively rotating sealing faces, for sealing said space between said shaft and the walls of said shaft-opening,
(v) lubricant chamber means for holding lubricating fluid in contact with the inner edges of said sealing faces, and
(vi) first fluid conduit means communicating said lubricant chamber means with said inlet chamber;
(b) a cyclone separator having a separating chamber therein, inlet means admitting fluid to be cleaned into said separating chamber, outlet means discharging a contaminated fraction of said fluid from said separating chamber, and overflow means discharging a cleaned fraction of said fluid from said separating chamber;
(c) second fluid conduit means communicating said outlet chamber of said pump with said inlet means of said separating chamber;
(d) third fluid conduit means communicating said outlet means of said separating chamber with said inlet chamber of said pump; and
(e) fourth fluid conduit means communicating said overflow means of said separating chamber with said lubricant chamber means.

10. A fluid pumping apparatus having a shaft seal lubricated by a portion of the fluid being pumped, said pumping apparatus comprising:
(a) a centrifugal pump including
(i) a housing having an inlet chamber and an outlet chamber, said housing providing a shaft-opening therein,
(ii) a shaft rotatably mounted in said shaft-opening and spaced from the walls thereof,
(iii) a centrifugal impeller carried by said shaft inside of said housing and arranged to impel fluid from said inlet chamber to said outlet chamber upon rotation of said shaft,
(iv) seal means in said shaft-opening, said seal means comprising a rotating sealing ring carried by said shaft and a stationary sealing ring carried by said housing, said sealing rings having opposed, relatively rotating sealing faces, for sealing said space between said shaft and the walls of said shaft-opening,
(v) lubricant chamber means for holding lubricating fluid in contact with the inner edges of said sealing faces, and
(vi) first fluid conduit means communicating said lubricant chamber means with said inlet chamber;
(b) a cyclone separator providing a conical separating chamber therein, inlet means admitting fluid to be cleaned tangentially into said conical chamber adjacent to the wide end thereof, outlet means adjacent to the apex of said conical chamber discharging a contaminated fraction of said fluid from said conical chamber, and overflow means discharging a cleaned fraction of said fluid from a zone in said conical chamber adjacent to the axis thereof and between said inlet means and said outlet means of said conical chamber;
(c) second conduit means communicating said outlet chamber of said pump with said inlet means of said conical chamber;
(d) third fluid conduit means communicating said outlet means of said conical chamber with said inlet chamber of said pump; and
(e) fourth fluid conduit means communicating said overflow means of said conical chamber with said lubricating chamber means.

11. A fluid pumping apparatus having a shaft seal lubricated by a portion of the fluid being pumped, said pumping apparatus comprising:
(a) a fluid pump including
(i) a housing having an inlet chamber and an outlet chamber, said housing providing a shaft-opening therein,
(ii) a shaft rotatably mounted in said shaft-opening and spaced from the walls thereof,
(iii) an impeller arranged to impel fluid from said inlet chamber to said outlet chamber, said impeller being actuated by rotation of said shaft,
(iv) seal means comprising a rotating sealing element carried by said shaft and a stationary sealing element carried by said housing, said elements having opposed, relatively rotating sealing faces, for sealing the space between said shaft and the walls of said shaft-opening, and
(v) means for applying lubricating fluid to said opposed sealing faces;
(b) a first cyclone separator having a separating chamber therein, inlet means admitting fluid to be cleaned into said separating chamber, outlet means discharging a contaminated fraction of said fluid from said separating chamber, and means discharging a cleaned fraction of said fluid from said separating chamber;
(c) a second cyclone separator having a separating chamber therein, inlet means admitting fluid to be cleaned into said separating chamber, outlet means discharging a contaminated fraction of said fluid from said separating chamber, and means discharging a cleaned fraction of said fluid from said separating chamber;
(d) first fluid conduit means communicating said outlet chamber of said pump with said inlet means of said first cyclone separator;
(e) second fluid conduit means communicating said outlet means of said first cyclone separator with said inlet chamber of said pump;
(f) third fluid conduit means communicating said means discharging a cleaned fraction of said fluid from said first cyclone separator with said inlet means of said second cyclone separator;
(g) fourth fluid conduit means communicating said outlet means of said second cyclone separator with said inlet chamber of said pump; and
(h) fifth fluid conduit means communicating said means discharging a cleaned fraction of said fluid from said second cyclone separator with said means for applying lubricating fluid to said opposed sealing faces.

12. A double pump apparatus having two stages and having two shaft seals lubricated by a portion of the fluid being pumped, said pumping apparatus comprising:
(a) a double fluid pump including
(i) a housing having a pair of aligned shaft-openings therein and having a first stage pump and a second stage pump therein, each of said first stage pump and said second stage pump having an inlet chamber and an outlet chamber,
(ii) means conducting fluid from said outlet chamber of said first stage pump to said inlet chamber of said second stage pump,
(iii) a shaft rotatably mounted in said aligned shaft-openings and spaced from the walls thereof,
(iv) a pair of centrifugal impellers carried by said shaft inside of said housing, one of said impellers being arranged to impel fluid from said inlet chamber to said outlet chamber of said first stage pump and the other of said impellers being arranged to impel fluid from said inlet chamber to said outlet chamber of said second stage pump upon rotation of said shaft,
  (v) a pair of seal means, one in each of said shaft-openings, each said seal means comprising a rotating sealing ring carried by said shaft and a stationary sealing ring carried by said housing, said sealing rings having opposed, relatively rotating sealing faces, for sealing said spaces between said shaft and the walls of said shaft-openings,
  (vi) a pair of lubricant chamber means, each of said lubricant chamber means being associated with one of said seal means for holding lubricating fluid in contact with the inner edges of the opposed sealing faces of the seal means with which the lubricant chamber means is associated, and
  (vii) fluid conduit means communicating each of said lubricant chamber means with said inlet chamber of said first stage pump;
(b) a pair of cyclone separators, each said separator having a separating chamber therein, inlet means admitting fluid to be cleaned into said separating chamber, outlet means discharging a contaminated fraction of said fluid from said separating chamber, and means discharging a cleaned fraction of said fluid from said separating chamber;
(c) fluid conduit means communicating said outlet chamber of said first stage pump with the inlet means of each of said cyclone separators;
(d) fluid conduit means communicating the outlet means of each of said cyclone separators with said inlet chamber of said first stage pump;
(e) fluid conduit means communicating the means discharging a cleaned fraction of fluid from the separating chamber of one of said cyclone separators with one of said lubricant chamber means; and
(f) fluid conduit means communicating the means discharging a cleaned fraction of fluid from the separating chamber of the other of said cyclone separators with the other of said lubricant chamber means.

13. A fluid pumping apparatus having a shaft seal lubricated by a portion of the fluid being pumped, said pumping apparatus comprising:
(a) a centrifugal pump including
  (i) a housing having an inlet chamber and an outlet chamber, said housing providing a shaft-opening therein,
  (ii) a shaft rotatably mounted in said shaft-opening and spaced from the walls thereof,
  (iii) a centrifugal impeller carried by said shaft inside of said housing and arranged to impel fluid from said inlet chamber to said outlet chamber upon rotation of said shaft,
  (iv) seal means in said shaft-opening, said seal means comprising a rotating sealing ring carried by said shaft and a stationary sealing ring carried by said housing, said sealing rings having opposed, relatively rotating sealing faces, for sealing said space between said shaft and the walls of said shaft-opening,
  (v) lubricant chamber means for holding lubricating fluid in contact with the inner edges of said sealing faces, and
  (vi) first fluid conduit means communicating said lubricant chamber means with said inlet chamber;
(b) a pair of cyclone separators, each said separator providing a conical separating chamber therein, inlet means admitting fluid to be cleaned tangentially into said conical chamber adjacent to the wide end thereof, outlet means adjacent to the apex of said conical chamber discharging a fraction of said fluid from said conical chamber, and overflow means discharging another fraction of said fluid from a zone in said conical chamber adjacent to the axis thereof and between said inlet means and said outlet means of said conical chamber;
(c) second fluid conduit means communicating said outlet chamber of said pump with the inlet means of one of said cyclone separators;
(d) third fluid conduit means communicating the overflow means of said one of said cyclone separators with the inlet chamber of said pump;
(e) fourth fluid conduit means communicating the outlet means of said one of said cyclone separators with the inlet means of the other of said cyclone separators;
(f) fifth fluid conduit means communicating the outlet means of said other of said cyclone separators with the inlet chamber of said pump; and
(g) sixth fluid conduit means communicating the overflow means of said other of said cyclone separators with said lubrication chamber means.

References Cited by the Examiner

UNITED STATES PATENTS

| | | | |
|---|---|---|---|
| 2,010,435 | 8/1935 | Matheson | 210—512 |
| 2,608,380 | 8/1952 | Rice | 277—15 |
| 2,765,918 | 10/1956 | Fontein et al. | 210—512 |
| 2,900,919 | 8/1959 | Anderson et al. | 103—111 |
| 3,052,361 | 9/1962 | Whatley et al. | 210—73 |

MARK NEWMAN, *Primary Examiner.*

HENRY F. RADUAZO, *Examiner.*